United States Patent [19]
Reddersen et al.

[11] Patent Number: 5,565,668
[45] Date of Patent: Oct. 15, 1996

[54] MULTIPLE FOCUS OPTICAL SYSTEM FOR DATA READING APPLICATIONS

[75] Inventors: Brad R. Reddersen; Thomas C. Arends, both of Eugene, Oreg.

[73] Assignee: Spectra-Physics Scanning Systems, Inc., Eugene, Oreg.

[21] Appl. No.: 475,748

[22] Filed: Jun. 7, 1995

Related U.S. Application Data

[63] Continuation of Ser. No. 80,036, Jun. 18, 1993, Pat. No. 5,438,187, which is a continuation-in-part of Ser. No. 786,121, Nov. 5, 1991, abandoned.

[51] Int. Cl.$^6$ ........................................................ G06K 7/10
[52] U.S. Cl. ............................................ 235/462; 359/204
[58] Field of Search ........................................ 235/462, 467, 235/472; 359/204

[56] References Cited

U.S. PATENT DOCUMENTS

| | | | |
|---|---|---|---|
| 4,808,804 | 2/1989 | Krichever et al. | 235/454 |
| 5,073,702 | 12/1991 | Schuhmacher | 235/467 |
| 5,200,597 | 4/1993 | Eastman et al. | 235/462 |
| 5,386,105 | 1/1995 | Quinn et al. | 235/462 |

FOREIGN PATENT DOCUMENTS 3-257689  11/1991  Japan .................................... 235/462

*Primary Examiner*—John Shepperd
*Attorney, Agent, or Firm*—Lyon & Lyon

[57] ABSTRACT

An optical system and method for data reading having a light source which generates an optical beam directed toward an object to be read and a focusing system in the outgoing light path which establishes multiple beam functions. In a preferred application, a scanning system includes a multifocal lens having a single lens element having an inner lens portion of a first focal length and an outer annular lens portion with a second focal length, the optical system of a bar code scanner therefore establishing two separate focal positions from a single light source. Alternately, the system includes a focusing lens system with an corrector element disposed in the outgoing optical path, the corrector element having a plurality of optical zones, each zone having a different optical characteristic for modifying a portion of the outgoing optical beam. A zone may be a refractive region, a reflective region, a diffractive region, an empty region, a window region, or combinations thereof. In one embodiment, the system has two optical elements, namely a glass main focusing lens and a plastic corrector plate.

12 Claims, 8 Drawing Sheets

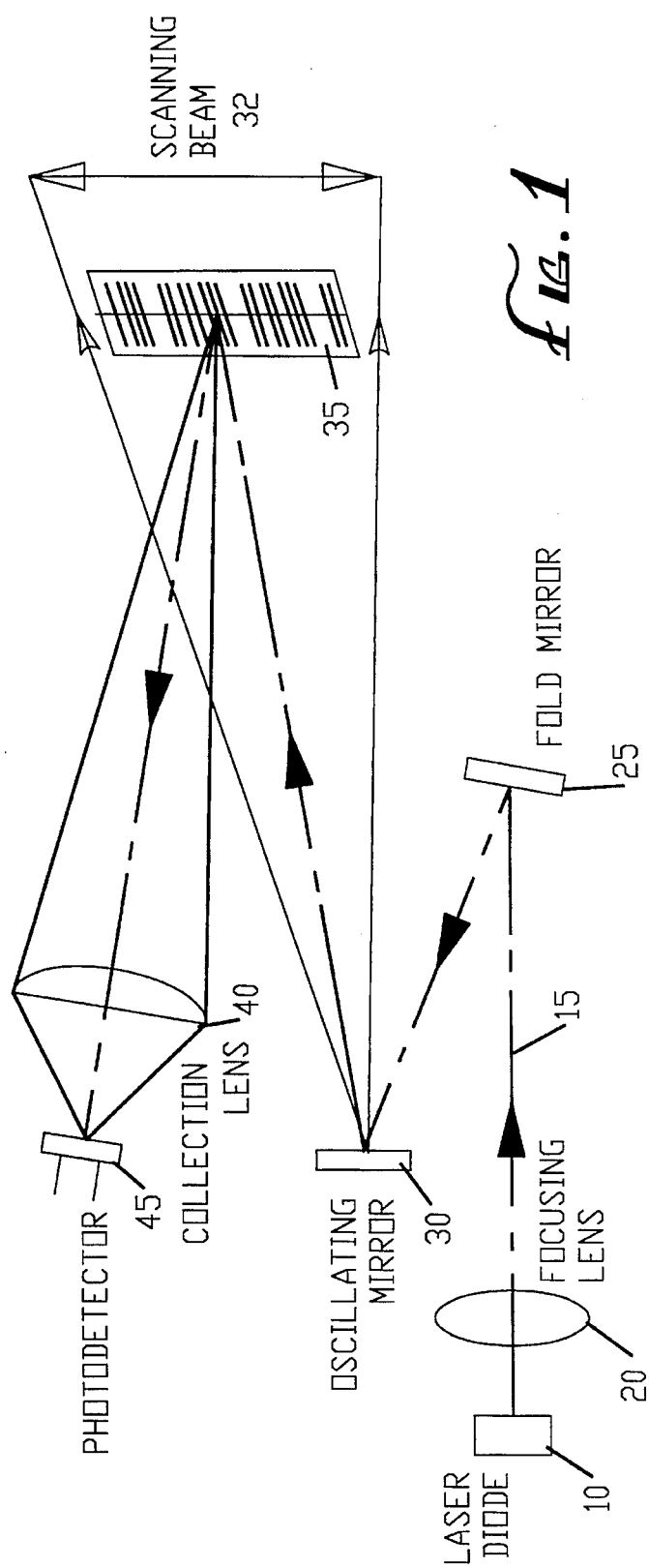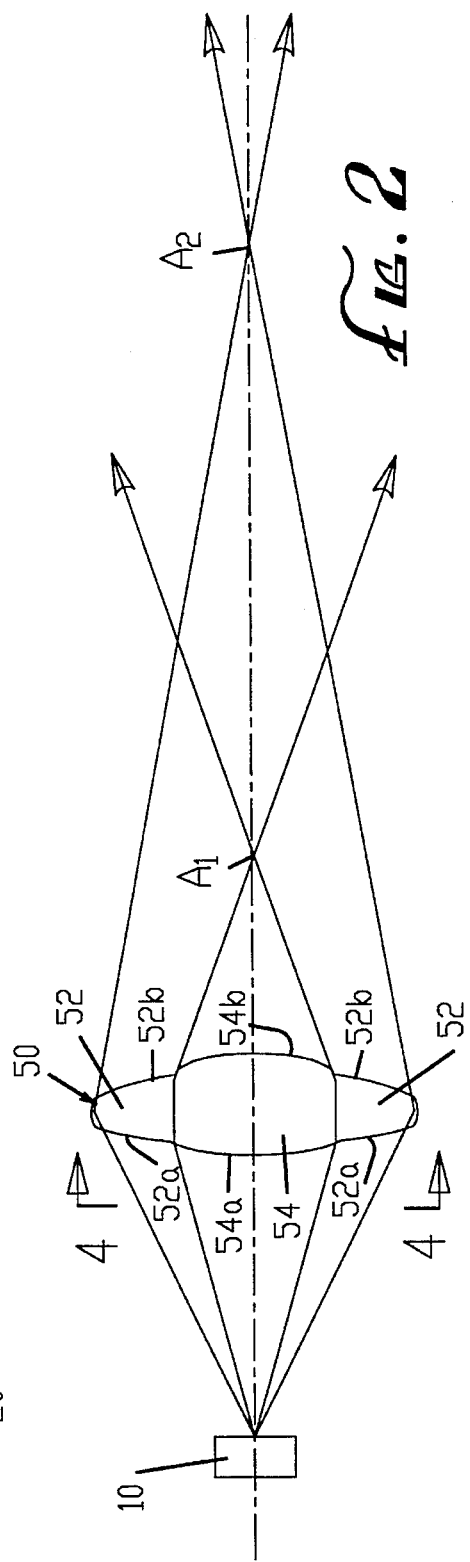

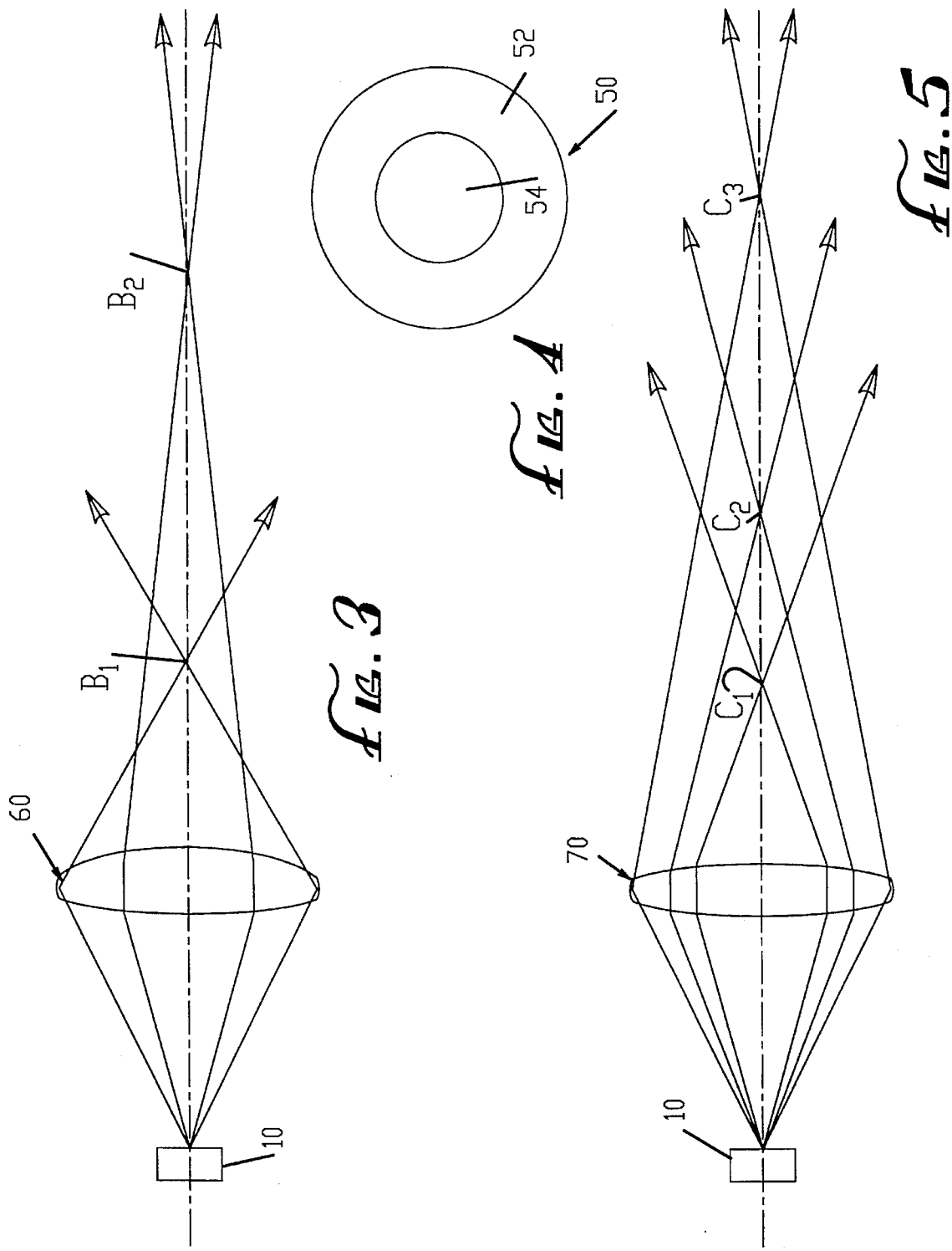

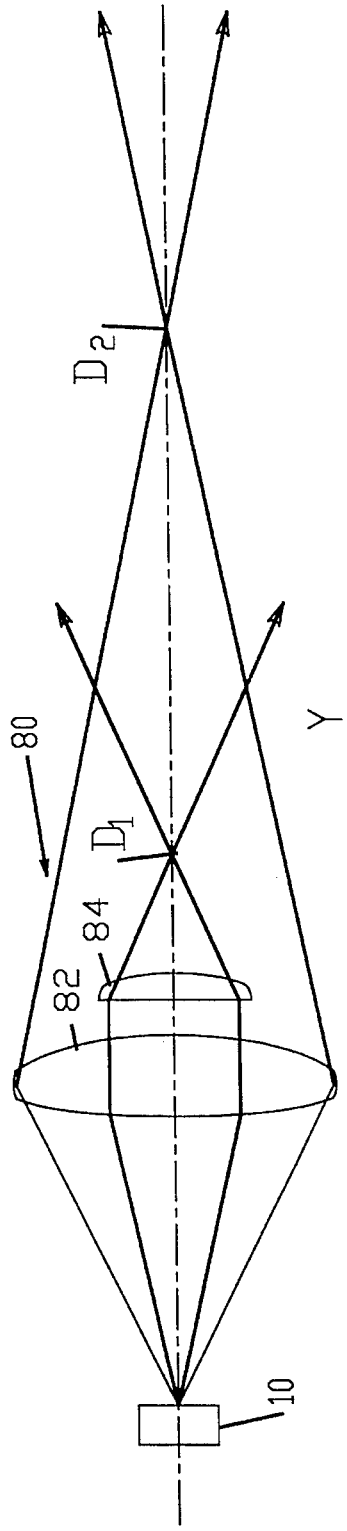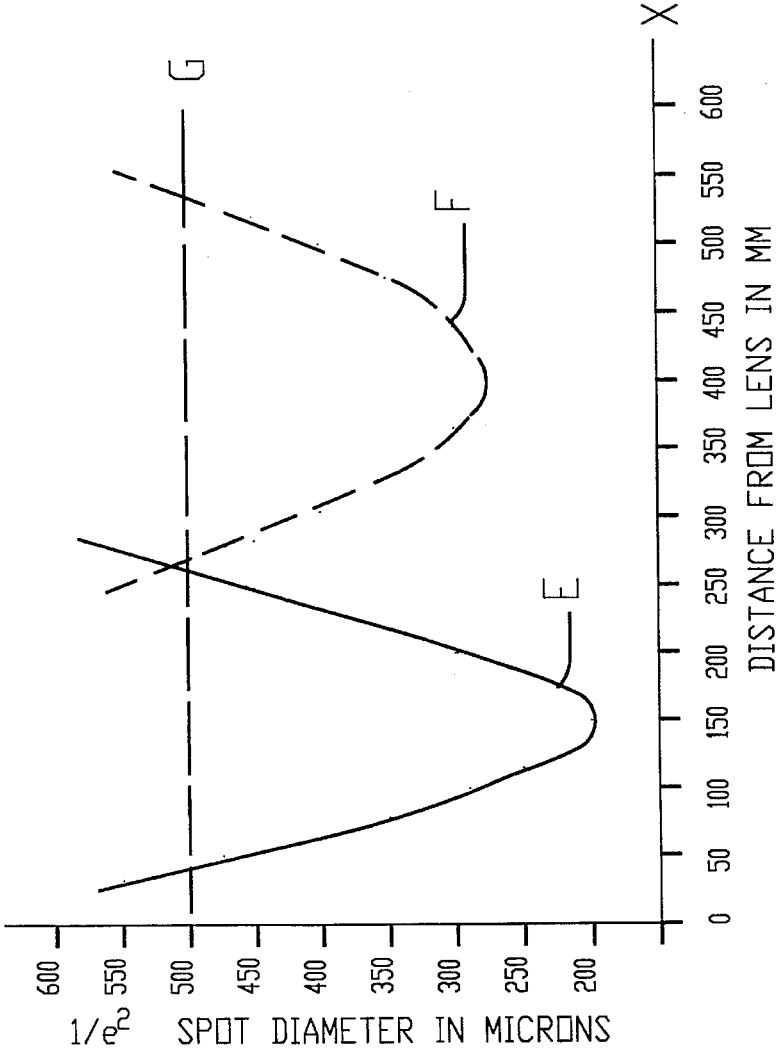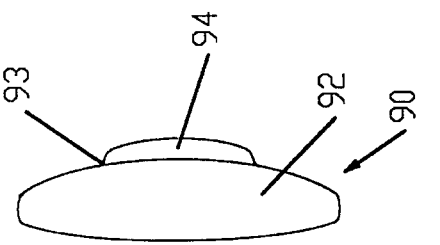
fig. 6
fig. 7
fig. 6A

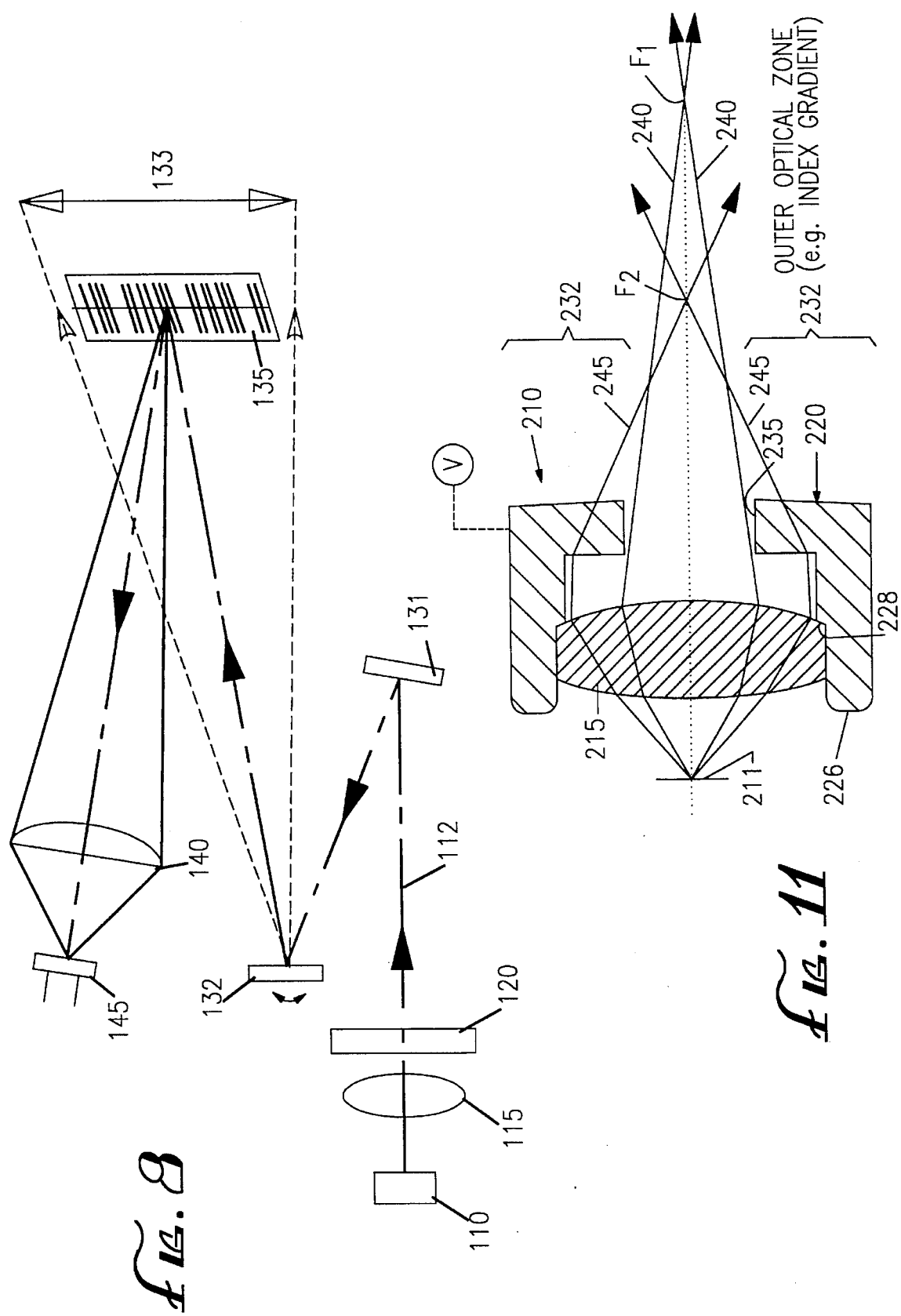

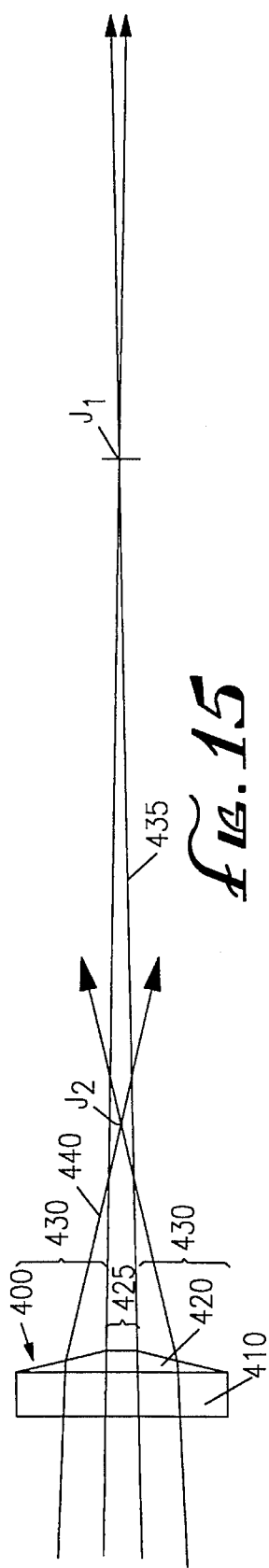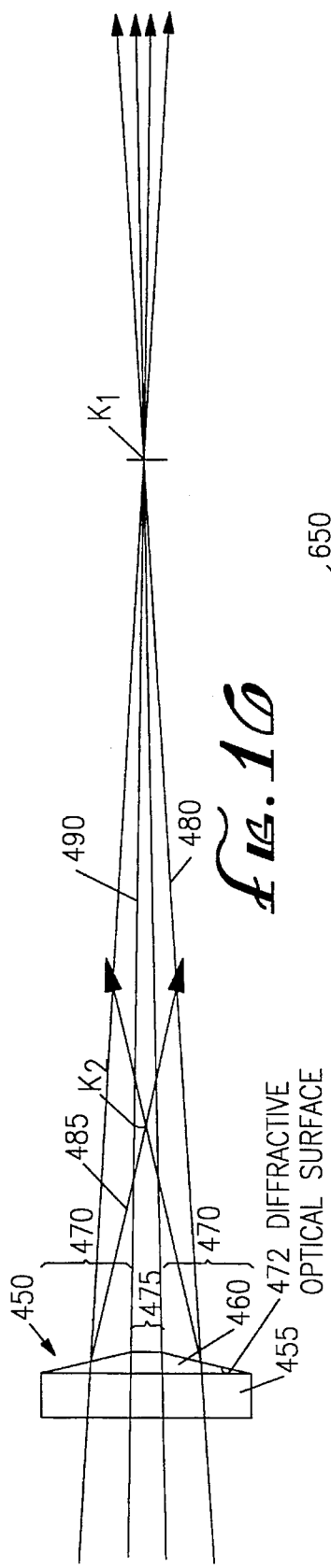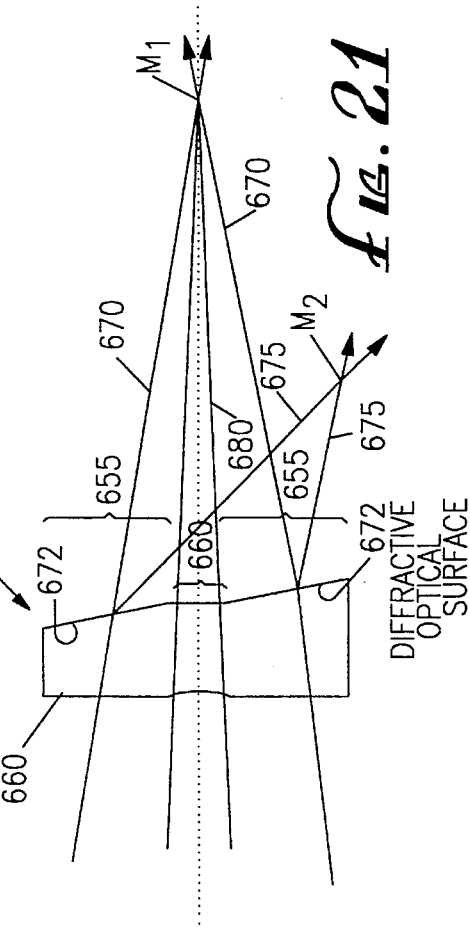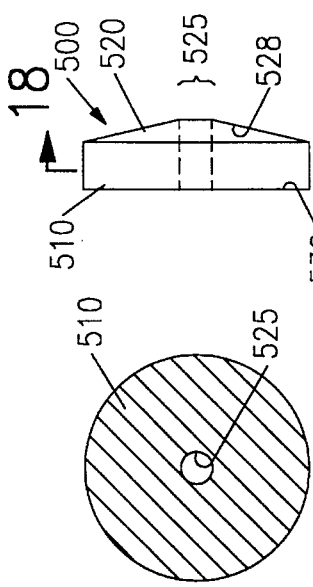

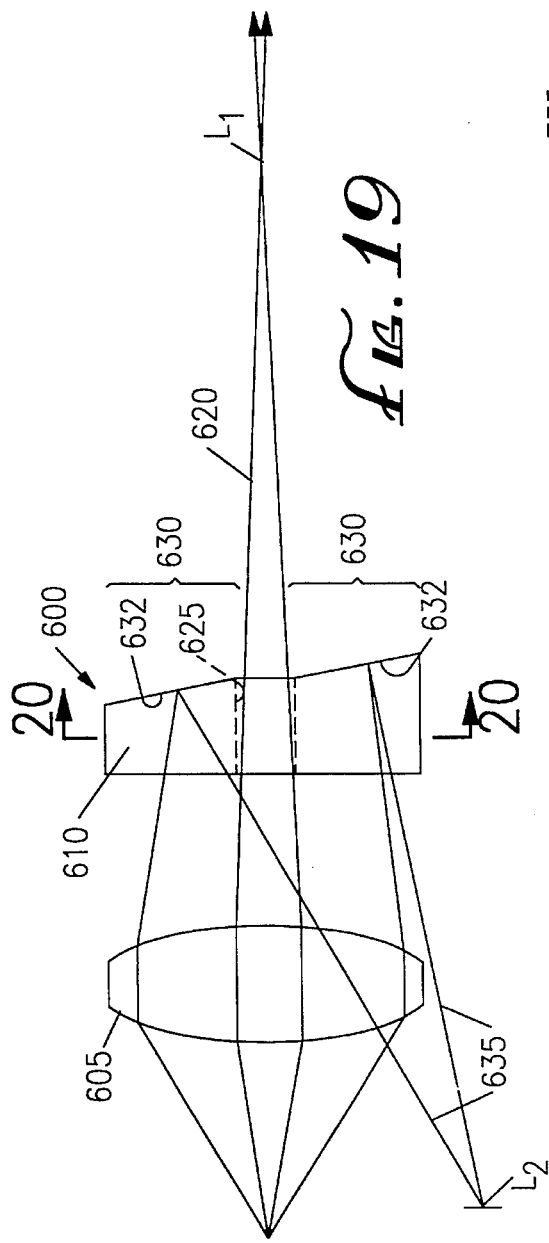
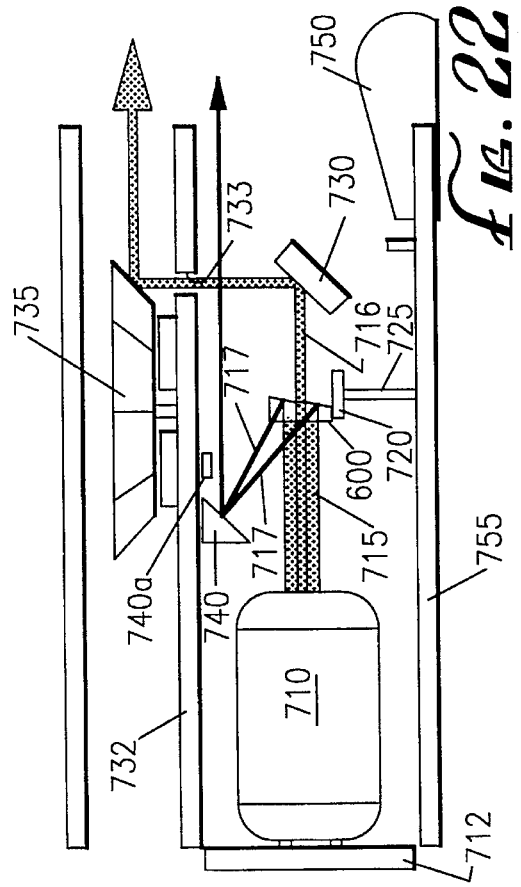
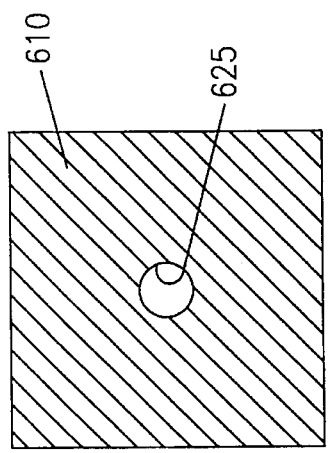

5,565,668

MULTIPLE FOCUS OPTICAL SYSTEM FOR DATA READING APPLICATIONS

RELATED APPLICATION DATA

This is a continuation of application Ser. No. 08/080,036 filed on Jun. 18, 1993 now U.S. Pat. No. 5,438,187, which is a continuation-in-part of application Ser. No. 07/786,121 filed Nov. 5, 1991 now abandoned.

BACKGROUND OF THE INVENTION

The field of the present invention relates to data reading systems and particularly to an optical system having a multiple function outgoing beam. The invention may be especially suitable for use with a symbol scanning system for reading bar codes such as those found on consumer products, for example the UPC code. The invention is suitable for stationary or handheld scanners.

Bar code scanners, as any optical system, depend upon focused optics for effective and accurate performance. Typical bar code scanners employ a source of coherent light from a laser or laser diode with the light scanned in various directions across a window. Other scanners using non-coherent light sources have also been suggested such as disclosed in U.S. Pat. No. 4,335,302.

In a detection system such as a bar code scanning device employing a focusing lens, a light source (such as a laser, laser diode, or non-coherent light source, e.g. light emitting diode) emits light which passes through and is focused by the focusing lens. The object containing the bar code is passed through the focused beam and if the beam spot striking the bar code is of sufficiently small size and shape, reflected light from the bar code may be detected resulting in a successful scan.

As will be described herein, a light beam such as a that produced by a laser diode is typically not a discrete point but is focused to what may be referred to as a "waist" which is the position along the beam axis where the "cone" of light from the light source reaches a minimum spot size in a given direction, typically in a direction parallel to the direction of spot motion.

A problem arises when the bar code or object being scanned does not fall sufficiently close to the waist, that is when the spot size or waist diameter is too large (generally in the direction parallel to the direction of spot motion) to successively read a symbol. By way of example referring to a handheld scanner in a market checkout application, a product bearing the UPC bar code is passed at a certain distance in front of the window of the checkout scanner. The checkout scanner is designed with its waist of a given diameter positioned at a certain distance from the window where the bar code is expected to pass. The checkout clerk must become familiar with the proper distance to pass the object in front of the window, that is the bar code must pass sufficiently close to the scanner focal point or waist (i.e. within its depth of field) in order to achieve a successful scan.

A typical focusing lens must ordinarily be manufactured to relatively exacting specifications in order to provide the desired focusing properties. Assorted manufacturing variances, in both the focusing lens and other elements, may introduce undesirable effects into the optical beam. Temperature effects may also introduce variations into the optical properties. Moreover in some applications, it may be desirable for the scanning device to possess a plurality of operations, for example the ability to function over a range of distances or provide an aiming spot.

There have been several suggestions on how to increase the depth of field available for a particular scanner. In one system, a focusing lens is designed with an axially movable lens element (such as a zoom lens) to permit changing the focusing power to change the depth of field. Such systems require complicated mechanical lens adjustment and/or may require the user no manually make focusing adjustments. It is desirable to eliminate the need for focus adjustment either by mirror or lens adjustment and be able to achieve a wide range or variable range of focal distances.

SUMMARY OF THE INVENTION

The present invention relates to an optical system and method for data reading. In a first embodiment, the system includes (1) a light source which generates an optical beam directed toward an object and (2) a focusing system in the outgoing light path which establishes multiple beam functions. In a preferred application, a scanning system includes a multifocal lens having a single lens element having an inner lens portion of a first focal length and an outer annular lens portion with a second focal length, the scanning system therefore establishing two separate focal positions from a single light source. In a second embodiment, the system includes a focusing lens system with an corrector element disposed in the outgoing optical path, the corrector element having a plurality of optical zones, each zone having a different optical characteristic for modifying a portion of the outgoing optical beam. A zone may be a refractive (bending) region, a reflective region, a diffractive region, an empty region (a hole), a window region (no optical power), an index gradient region, or combinations thereof, each zone taking on different parameters independently of the other zones. In one preferred embodiment for use in a multifocus scheme, the optical corrector element, located adjacent a focusing lens element, includes a plurality of zones, namely a central zone and an outer annular zone, the central zone having a first optical power through which a portion of the outgoing beam is focused to a first waist location, and the outer zone having a second optical power through which another portion of the outgoing beam is focused to a second waist location different from the first.

BRIEF DESCRIPTION OF THE DRAWINGS

FIG. 1 is a schematic diagram of an optical system according to the present invention illustrating a multifocal lens embodiment;

FIG. 2 is a diagrammatic view of a multifocus lens system having two separate focal points;

FIG. 3 is a diagrammatic view of an alternate configuration for a multifocus lens system having two separate focal points;

FIG. 4 is a front elevation view of the lens element of FIG. 2 taken along the line 2—2;

FIG. 5 is a diagrammatic view of another alternate configuration for a multifocal lens system having three separate focal points;

FIG. 6 is a diagrammatic view of another alternate configuration for a multifocal lens system having two separate lens elements;

FIG. 6A is a diagrammatic view of another alternate configuration for a multifocal lens system having a primary lens element with a lenslet attached thereto;

FIG. 7 is a graph illustrating plots of example spot diameters for a multifocal lens;

FIG. 8 is a schematic diagram illustrating of an optical system illustrating a corrector plate embodiment;

FIG. 11 is a diagrammatic side view of an alternate optical corrector plate and focusing lens combination;

FIG. 15 is a diagrammatic side view of another alternate optical corrector plate configuration;

FIG. 16 is a diagrammatic side view of another alternate optical corrector plate configuration;

FIG. 17 is a diagrammatic side view of another alternate optical corrector plate configuration;

FIG. 18 is a cross sectional view of FIG. 17 taken along line 17—17;

FIG. 19 is a diagrammatic side view of another alternate optical corrector plate configuration;

FIG. 20 is a cross sectional view of FIG. 20 taken along line 20—20;

FIG. 21 is a diagrammatic side view of another alternate optical corrector plate configuration; and FIG. 22 is a schematic of an optical scanning system employing the optical corrector plate of FIG. 19.

DESCRIPTION OF THE PREFERRED EMBODIMENT

Figure 9:
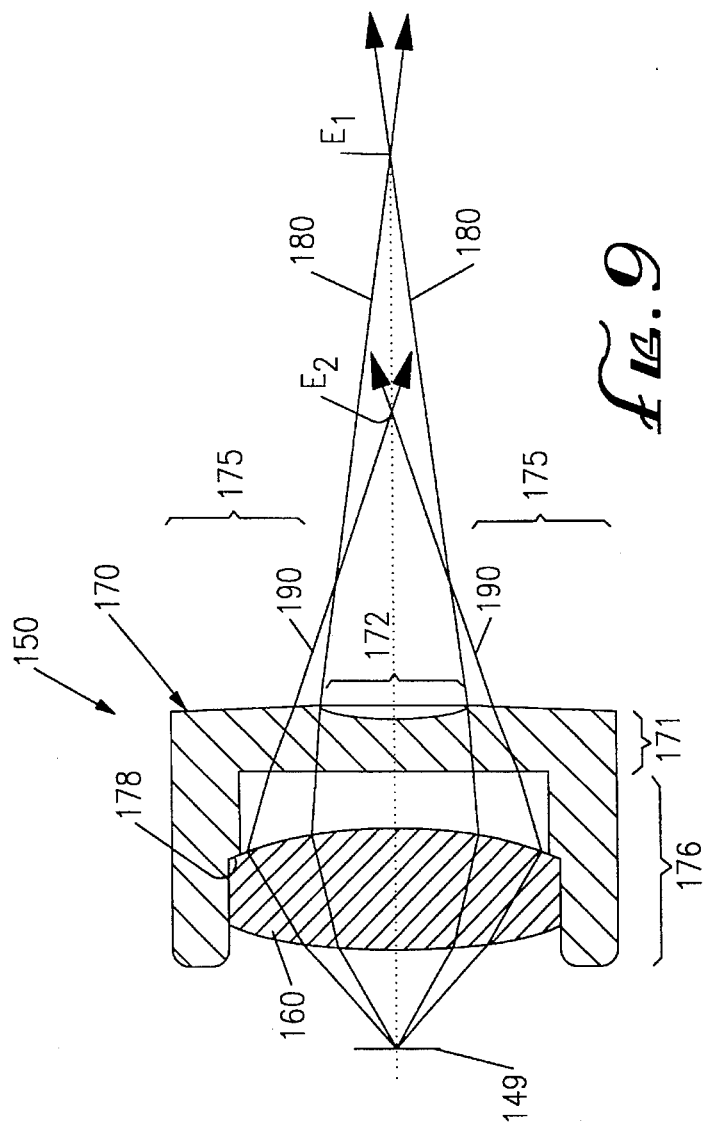
FIG. 9 is a diagrammatic side view of a preferred optical corrector plate and focusing lens combination.

The preferred embodiments will now be described with reference to the drawings. To facilitate description, any numeral identifying an element in one figure will represent the same element in any other figure.

FIG. 1 is a schematic diagram of a scanning system such as that which may be employed by the present invention. A light source illustrated as a laser diode 10 emits light 15 being aimed at the desired target shown as the UPC bar code 35. Light 15 from the laser diode 10 is focused by a focusing lens 20. The focused beam is reflected off fold mirror 25 and is directed to the oscillating mirror 30. As the oscillating mirror 30 pivots, the beam scans over a scanning beam range 32. Light reflected off the bar code 35 is focused by a collection lens 40 and detected by the photodetector 45.

To clarify terminology, as used herein when referring to a scanner, the resolving axis shall refer to the axis of the spot along the scanning direction. The non-resolving axis shall refer to the direction perpendicular to the scanning direction. It is also noted that a scanning beam produced by a laser diode is astigmatic, that is its waist or minimum spot diameter is not necessarily in the same location in all axial directions. Unless otherwise specified, when it is referred that a beam "focal point", waist diameter, or waist location is specified, it is meant to refer to one or more axes but not necessarily all axes.

The optics of the scanning system are constructed such that the focusing lens 20 achieves a focal "point" or waist position at a distance (or distances depending upon the design of the lens 20 according to the preferred embodiments described below) from the scanner at or near the anticipated position of the targeted bar code 35. The light source 10 may be any suitable light source including: a coherent light source such as a laser or laser diode, a non-coherent light source such as a light emitting diode, or combinations thereof.

FIGS. 2 and 4 illustrate a preferred focusing lens system comprised of a multifocal lens 50 including an outer lens portion 52 having a first focal length and an inner lens portion 54 having a second focal length. Light from source 10 passing through the inner lens portion 54 focuses at a first focal point $A_1$ and light passing through the outer lens portion 52 is focused at a second focal point $A_2$ located further from the lens 50 than is the first focal point $A_1$.

The net effect of the multifocal lens 50 is to have two separate foci $A_1$ and $A_2$ formed from a single axis of light. In data reading applications such as bar code scanning, this design provides several advantages. A scanner with two focal points $A_1$ and $A_2$ would have two different depths of field regions resulting in an overall longer depth of field than a conventional lens with only a single focal point. Such a design is simple and relatively inexpensive and does not require movable focusing elements.

The specific design of the multifocal lens 50 will depend on various factors for a particular application including the type of light source, light source intensity distribution, target size and type, and external factors such as the desired distances to the focal points, spot diameters at the focal points, aperture stops including outside of the lens system, lens diameter(s), and cost constraints.

FIG. 2 also diagrammatically illustrates a preferred bifocal lens shape suitable for use with a laser diode scanner. The inner lens portion 54 has a front lens surface 54a and a rear lens surface 54b each of given curvature. Both the front and rear surfaces 54a and 54b are preferably aspheric, with a complex generally convex shape. Similarly the outer lens portion 52 has a front lens surface 52a and a rear lens surface 52b each of a given curvature. Both the front and rear surfaces 52a and 52b are preferably aspheric.

Rotationally symmetric lenses are generally easier and less expensive to manufacture, but nonrotationally symmetric lenses may be desirable for certain applications.

FIG. 7 is a graph representing optical performance of the preferred embodiment of the lens design for a finished product. The x-axis shows where a value on the curve is calculated as the distance from the lens in mm. (This is the distance between, for example, lens portion 54 and point $A_1$ in the short focus case of FIG. 2.)

The y-axis represents the spot diameter of a laser beam focused by the bifocal lens. This spot diameter is expressed in microns (units of $10^{-3}$ mm) and is measured at the width of the focused Gaussian laser beam in the revolving axis where the intensity is $1/e^2$ times as large as at the center of the focused beam.

The graph of FIG. 7 shows two different curves of data. The solid line Curve E represents the change in spot diameter for a Gaussian laser beam with a wavelength of 670 nm, with a best focus diameter of 200 microns, the focal point located 150 mm from the lens. On either side of the best focus, the spot diameter gets larger, as shown in the solid curve.

The curve data is theoretically derived from the Gaussian Beam propagation equation:

$$w(z)=w_o[1+(\lambda z/\pi w_o^2)^2]^{1/2}$$

where:

2w$_o$=the minimum 1/e$^2$ spot diameter

2w(z)=the 1/e$^2$ spot diameter a distance z from the position of the minimum spot λ=the wavelength of the laser light source z=the distance from the minimum spot diameter where w(z) is to be measured.

If the solid line curve represents the short focus, the dotted line Curve F could represent the long focus optical system formed by surfaces 52*a* and 52*b*. In this case the long focus waist position has been positioned at 400 mm and has a minimum spot diameter of 275 microns.

To illustrate how this system would extend depth-of-field over a conventional single focus system, an example signal processing system will now be considered. In one kind of signal processing, it may be possible to successfully "decode" carrier signals scanned (i.e., light reflecting and/or scattering off the target bar code) where the 1/e$^2$ spot diameter of the spot is 1.4× as large as the minimum bar width being scanned. Using this assumption as a guideline, a spot 500 microns in diameter would be able to read bar codes with a bar width of 500/1.4 microns, which is 357 microns or approximately 14 mils. If the spot size is 500 microns or smaller, then, it is possible under this signal processing assumption that a scanner could "decode" labels of 357 microns or larger.

Now, drawing a line G across both curves E and F at the 500 micron spot size point, it may be seen that the short focus lens element will be able to resolve the 357 micron bar widths over a distance of about 214 mm, or from 43 mm (at the closest point) to a distance of 257 mm (the furthest point). The long focus lens element will be able to resolve the 357 micron bar widths over a distance of about 270 mm, or from 265 mm to 535 mm.

Combining the two lens elements in one device provides a total "read" range for the scanner running from 43 mm to 535 mm almost continuously. This lens system provides a significant increase in depth-of-field over a lens designed for either "best focus" condition, and yet still allows reading even smaller bar widths within the narrower regions around the "best focus" points for each lens section.

It is recognized herein that there is the potential for noise problems because light from both lens portions will strike the object being scanned, but the design handles the problem. For example, if the bar code being scanned is positioned near the first focal point A$_1$, the light from the inner lens portion 54 (focused at the first focal point A$_1$) is focused to a very small spot, i.e., high intensity, and such light reflecting off the bar code is a high level carrier signal. At the same time, light from the outer lens portion 52 also strikes the bar code positioned near first focal point A$_1$, but this light is still fairly broad illumination and light reflected acts as a low level carrier signal which may be easily subtracted (or otherwise ignored) out by the signal processing electronics.

The reverse is also true in looking at the noise at the focal point A$_2$. Light from the inner lens portion 54 is out of focus by the time it reaches the outer focal point A$_2$ and is again low level carrier as far as the detection system is concerned. Such low level signal may be ignored or subtracted out by the signal processing electronics.

FIG. 3 illustrates an alternate multifocal lens system comprising a bifocal lens 60 which focuses light from the source 10 at two focal points B$_1$ and B$_2$. Light passing through an outer portion of the of the lens 60 is focused at near focal point B$_1$ and light passing through an inner portion of the bifocal lens 60 is focused at the far focal point B$_2$.

The first embodiment illustrated in FIG. 2 shows the inner portion of the lens 50 focusing close in (A$_1$) and the outer portion focusing further away (A$_2$). Since spot size is directly related to the ratio of the focal distance divided by the lens diameter used, the far field focus (A$_2$) is able to achieve a smaller spot size than would have been possible if the central zone of the lens were used to focus in the far field.

The alternate embodiment illustrated in FIG. 3 shows a multifocal lens having multiple focusing zones with the outer portion of the multifocal lens 60 focusing close in (B$_1$) and the inner portion focusing further away (B$_2$). The multifocal lens 60 divides the light into two cones of light. This configuration may also have advantages depending upon the particular application. By using the outer portion of the lens 60 to focus closest to the lens, that outer region may have less energy than the inner central "cone" of light. Since this lower amount of energy is focused close in to the lens 60 (and therefore the scanning device), the distance traveled from the lens 60 to the target (such as a bar code) and then back to the detector will be relatively short. The central cone of light, with more energy, focuses further away and will have a much longer path reflecting back to the scanner from its "best focus" point. The result is that the lower energy outer portion of light may be collected back at the sensing detector more efficiently because of the inverse square law of energy propagation in space.

FIG. 5 illustrates another alternative multifocal lens system comprising a multifocal lens 70 which focuses light from the source 10 at three separate focal points C$_1$, C$_2$ and C$_3$. Light passing through outer portion of the multifocal lens 70 is illustrated to focus at the far focal point C$_3$ and light passing through an inner portion of the multifocal 70 is illustrated to focus at the near focal point C$_1$. Light passing through a central annular portion of the multifocal lens 70 is illustrated to focus at the near focal point C$_2$.

Other light focusing configurations may be designed for a desired applications. In FIGS. 2, 3, and 4 the multifocal lenses are configured from a single lens element. Multifocal lenses may be constructed out of multiple lens elements which may be integrated together such as a single focus lens with another lenslet attached by optical adhesive positioned at the center of the beam. An example of such a configuration is shown in FIG. 6A where a multifocus lens 90 is comprised of a primary lens element 92 with a lenslet 94 attached thereto by optical adhesive 93. The lenslet 94 may be positioned on either side of the primary lens element 92 and either concentrically or laterally positioned thereto.

Alternately, multiple lens elements may be separately arranged. FIG. 6 illustrates yet another alternative multifocal lens system comprising a multifocal lens 80 which includes two separate lens elements, a rear lens element 82 and a front lens element 84. Light from the source 10 is thereby focused at two separate focal points D$_1$ and D$_2$. Light passing through the rear lens element 82 which does not pass through front lens element 84 is illustrated to focus at the far focal point D$_2$ and light passing through both the rear lens element 82 and the front lens element 84 is illustrated to focus at the near focal point D$_1$. Depending upon the optical properties of the front lens element 84, the location of focal point D$_1$ may alternately be located at a greater distance from the lens in similar fashion to the embodiment of FIG. 3.

Any lens combination which produces multiple focal points may be employed in the scanning system. Such lens combinations may include: aspheric lenses, spherical lens, combination lenses, holographic optical elements, Fresnel lenses, an annular disc and conventional lens combination, and combinations thereof. The lens material will depend upon the particular application and cost constraints. Polycarbonate and acrylic are the preferred materials, but other lens materials including other plastics or glass may be used by one skilled in the art.

FIG. 8 is a schematic diagram of an alternate optical system illustrating a corrector plate embodiment. A light source illustrated as a laser diode 110 emits light 112 being aimed at the desired target shown as the UPC bar code 135. Light 112 from the laser diode 110 is passed through focusing optics, illustrated in this embodiment as a single focusing lens 115, with the focused beam 112 then passing through corrector plate 120. The portion of the beam 112 which passes through the corrector plate 120 is reflected off fold mirror 131 and is directed toward a scanning mechanism shown in this embodiment as an oscillating mirror 132. As the oscillating mirror 132 pivots, the beam scans over a scanning beam range 133 along the bar code 135. The oscillating mirror 132 may comprise a scanning mirror such as a rotating optical polygon or other suitable scanning device.

Light reflected or scattered off the bar code 135 is collected by a suitable collection system shown in this embodiment as being focused by a collection lens 140 and detected by the photodetector 145. The optics of the optical system are constructed such that the focusing lens 120 achieves a waist location at a distance from the system at or near the anticipated position of the targeted bar code 135.

Though a preferred scanning mechanism and collection arrangement is described, any suitable scanning mechanism or collection system may be utilized in the present optical system. As for light sources, the light source 110 is preferably a laser diode, but may be any suitable light source including: a coherent light source such as a laser or laser diode, a non-coherent light source such as a light emitting diode, or combinations thereof. The focusing optics of focusing lens 115 may be comprised of one or more optical elements selected from the group consisting of: spherical, Fresnel and aspheric lenses or mirrors, holographic optical elements, index gradient elements, and combinations thereof.

As shown in FIGS. 8–9, the optical corrector plate 120 is positioned along the outgoing optical beam path 112 between the focusing lens 115 and the fold mirror 131. The optical corrector plate 120 is preferably positioned downstream of the focusing lens 115 so that the beam 112 is converging as it passes through the optical corrector plate 120. The optical corrector plate 120 may however be located at other positions such as between the light source 110 and the focusing lens 115 or between the fold mirror 131 and the scanning mirror 132.

Figure 10:
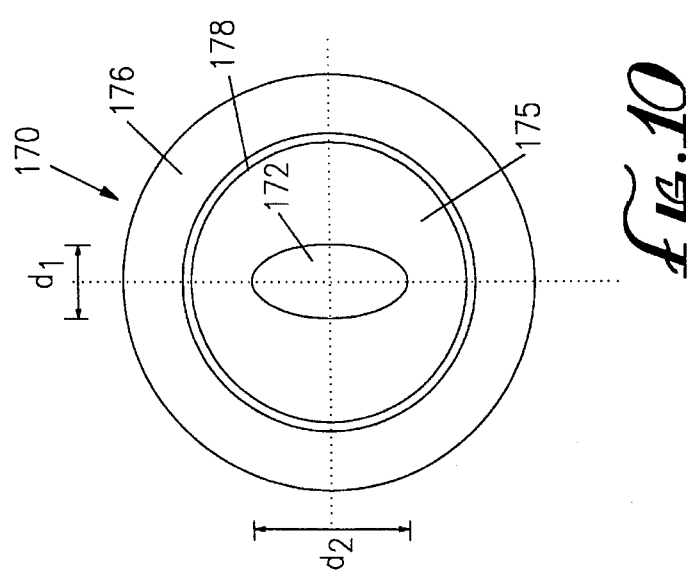
FIG. 10 is a rear plan view of the corrector plate of FIG. 9.

FIGS. 9–10 illustrate a preferred construction for the optical system having a unitary structure 150 comprising an outer holder and corrector plate 170 and a primary focusing optics illustrated as a focusing lens 160. The corrector plate 170 has a cylindrical lens holder portion 176 with an inner annular shoulder 178 (against which the focusing lens portion 160 is secured and/or mounted) and a corrector plate optics portion 171. The corrector plate 170 is preferably constructed in one-piece out of molded plastic with the corrector plate 170 assembled in a unitary structure 150 such that the primary focusing lens 160 provides for simple manufacture and assembly. In operation, light from the source plane 149 passes through the focusing lens 160 and is divided into two beam portions 180 and 190 by the corrector plate 170.

In a preferred configuration, the primary focusing optics comprises a single glass lens element 160, but may alternately be comprised of multiple lens elements, typically arranged in series. The outer holder and corrector plate 170 is preferably constructed from molded plastic with the corrector plate optics portion 171 including a first central section 172 and an outer annular focusing section 175. Light shown as emanating from a laser diode focus plane 149 is focused by a focusing lens system (illustrated as a single lens element 160), which if not further optically affected, would produce a beam of light at given waist location with a given spot diameter. Nonetheless, the beam portion passing through the central section 172 is focused to a waist location $E_1$. The location of the waist location $E_1$ will depend upon the optical properties (such as material and surface properties) and geometry of the central section 172. The central section 172 itself may be a focusing lens element. In addition, since the central section 172 and the outer annular section 175 have differing optical properties and provided the diameter $d_1$ or $d_2$ of the central section 172 is small enough to be within the diffractive limit of the optical beam (meaning that the aperture truncates the optical beam enough so as to affect the beam propagation in accordance with aperture diffraction theory) the size of the central section 172 itself will affect the location of $E_1$ waist. The outer annular section 175 simultaneously focuses a second portion of the optical beam to a waist location $E_2$.

In the preferred embodiment, such as for a bar code reading device, the primary focusing lens 160 is a spherical glass lens providing the primary focusing power which is placed in the vicinity of the laser diode 149 along the outgoing optical path. The corrector plate 120 is a molded plastic piece. The central section 172 is preferably elliptical in perimeter and has an optical figure or geometry designed to substantially correct the spherical aberration of the glass focusing lens 160. The diameter of the elliptical central section 172 is smaller in the resolving axis (i.e. the scanning direction) than in the non-resolving axis (i.e. orthogonal to the scanning direction). The size of the ellipse and its alignment to the laser diode 149 is selected to place the majority of the optical energy along the central or primary beam portion 180, to reduce the effects of the elliptically shaped beam exiting the laser diode 149 and provide a well-focused spot with high energy density with approximate uniform radial intensity.

The shape of the central zone 172 may also provide a desired spot geometry, for example it may be desirable to have a larger spot diameter in the non-resolving than in the resolving allowing the spot being read to average out so that specks and voids do not cause a false read. The shape of the central zone 172 is shown as elliptical, other shapes may be employed such as non-elliptical, circular, and rectangular. Though from a manufacturing standpoint, it is convenient to construct the central section 172 concentrically with respect to the outer annular section 175, the central section 172 may preferably be eccentrically positioned yet still provide both the focal power and the diffractive optical characteristics.

The outer annular section 175 of the corrector plate 171 is defined by a circular outer perimeter and an elliptical inner perimeter which matches the central portion 172. The outer annular portion 175 redirects a portion of the outgoing beam 190 to a secondary waist location $E_2$ that is substantially closer than the primary focus $E_1$. The secondary focus is used to read bar codes that are very near the exit window of the apparatus where the primary focus has not converged to a spot size which is small enough to successfully read the bar code. Since the secondary focus and the primary focus are well separated, there is little interference between them. For example, at the primary focus, the second focus beam 190 has diverged to a much greater spot size and therefore much lower intensity (power density). Since the ratio of primary beam 180 intensity to secondary beam 190 intensity may be greater than 10:1, there is little interaction between them. In similar manner, the primary beam 180 is too diffused to have a substantial effect on the beam 190 of the secondary focus.

To aid in the alignment and assembly of the primary lens element 160 and the corrector plate 170 combination, the corrector plate 170 may be provided with locating features molded therein that position the primary lens element 160 in the proper axial location in the desired alignment along the optical axis of the corrector plate 170. Such alignment features may comprise a bored hole the same diameter of the glass lens with a ridge or shoulder 178 which stops the lens element 160 in the appropriate axial position. Other types of mechanical alignment features may be fabricated to perform the desired positioning function. The elements such as primary lens element 160 and the corrector plate 170 may be of circular, rectangular or other suitable geometry.

FIG. 11 illustrates an alternative optical corrector plate and focusing lens combination 210 having a unitary structure comprising a corrector plate portion 220 and a primary focusing lens portion 215. Light from the source plane 211 passes through the focusing lens 215 and is divided into two beam portions 245 and 240 by the plate 220. The corrector plate 220 has a cylindrical lens holder portion 226 with an inner annular shoulder 228 (against which the focusing lens portion 215 is secured), an annular focusing portion 232, and a central gate portion 235. The central optical zone or gate portion 235 of the optical corrector plate 220 may comprise an elliptical-shape opening having a diameter in a resolving axis smaller than that in a non-resolving axis. The size and position of the central gate portion 235, in conjunction with the focusing lens 215, will determine (in accordance with aperture diffraction theory) the location for the waist at $F_1$. At the same time, the optical properties lens power of the outer annular section 232, in conjunction with the focusing lens 215, will focus light portion 245 passing therethrough to a waist at $F_2$.

As in the previous embodiment, the focusing lens 215 is readily constructed from glass or high quality optical material since the lens design need not be complex. The focusing lens 215 provides the primary focusing function for the system while the corrector plate 220, merely providing fine tuning of the optics, need not be manufactured to the finer tolerance. Moreover, the corrector plate 220 may be constructed from plastic and even though plastic is typically more temperature sensitive than glass, since the corrector plate 220 merely fine tunes focusing optics, temperature effects become less significant.

Figure 12:
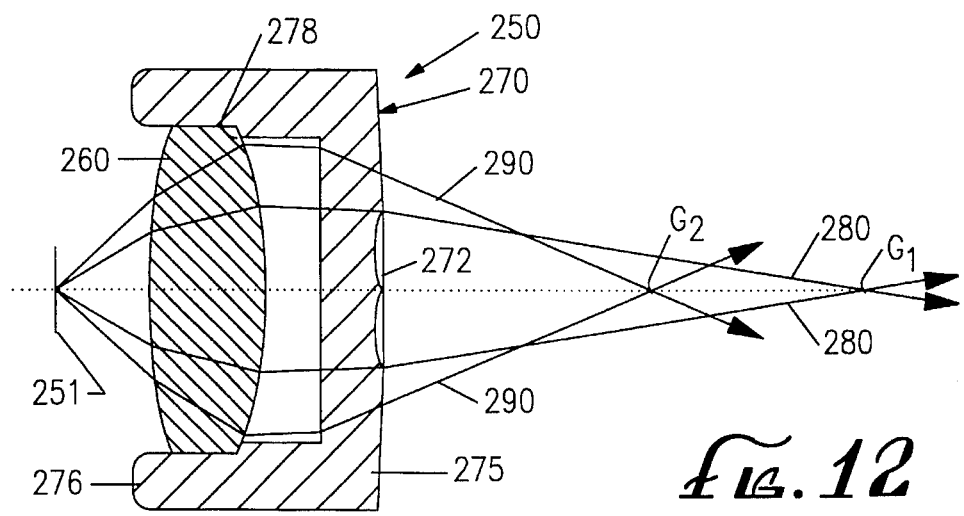
FIG. 12 is a diagrammatic side view of another alternate optical corrector plate and focusing lens combination.

FIG. 12 illustrates an alternative optical corrector plate and focusing lens combination 250 having a unitary structure comprising a corrector portion 270 and a primary focusing lens portion 260. Light from the source plane 251 passes through the focusing lens 260 and is divided into two beam portions 280 and 290 by the corrector plate 270. The corrector plate 270 has a cylindrical lens holder portion 276 with an inner annular shoulder 278 (against which the focusing lens portion 260 is secured), an annular focusing portion 275, and a central focusing portion 272. The central focusing portion 272 in this embodiment is shown as being integrally constructed (for example as a one-piece plastic molded component) from the same material. The outer surface of the central portion is configured to comprise a Schmidt corrector plate designed to make optical corrections to the light portion 280 passing therethrough. Moreover, the size and optical properties of the central focusing portion 272, in conjunction with the focusing lens 260, will determine the location for the waist at $G_1$. At the same time, the optical properties of the outer annular section 325, in conjunction with the focusing lens 260, will focus the light portion 345 passing therethrough to a waist at $G_2$.

Figure 13:
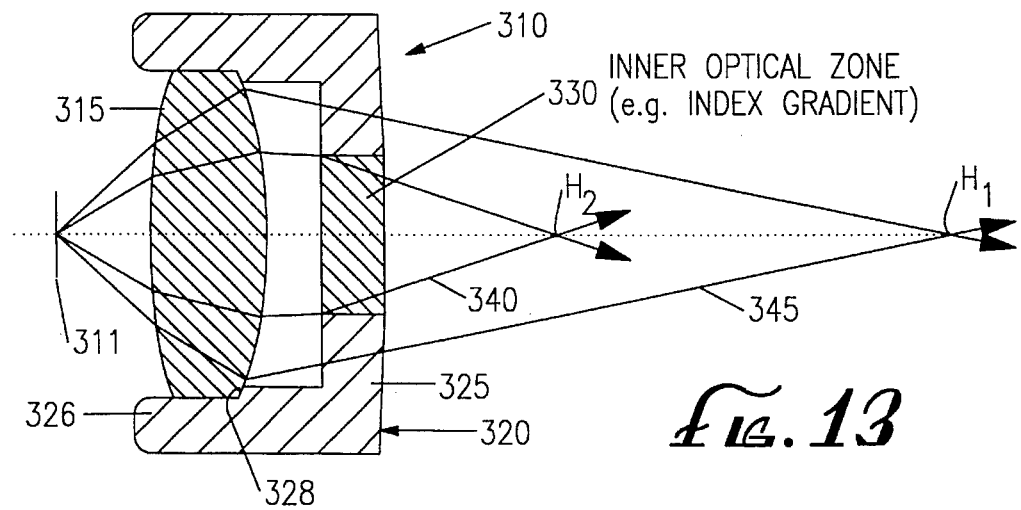
FIG. 13 is a diagrammatic side view of another alternate optical corrector plate and focusing lens combination.

FIG. 13 illustrates an alternative optical corrector plate and focusing lens combination 310 having a unitary structure comprising an outer portion 320 and a primary focusing lens portion 315. Light from the source plane 311 passes through the focusing lens 315 and is divided into two portions 345 and 340 by the plate 320. The corrector plate 320 has a cylindrical lens holder portion 326 with an inner annular shoulder 328 (against which the focusing lens portion 315 is secured), an annular focusing portion 325, and a central focusing portion 330. The central focusing portion 330 in this embodiment is shown as a element which may comprise different material than that of the outer annular portion 325. The size and optical properties of the central focusing portion 335 will determine the location for the waist at $H_2$. At the same time, the optical properties of the outer annular section 325, in conjunction with the focusing lens 315, will focus the light portion 345 passing therethrough to a waist at $H_1$.

Figure 14:
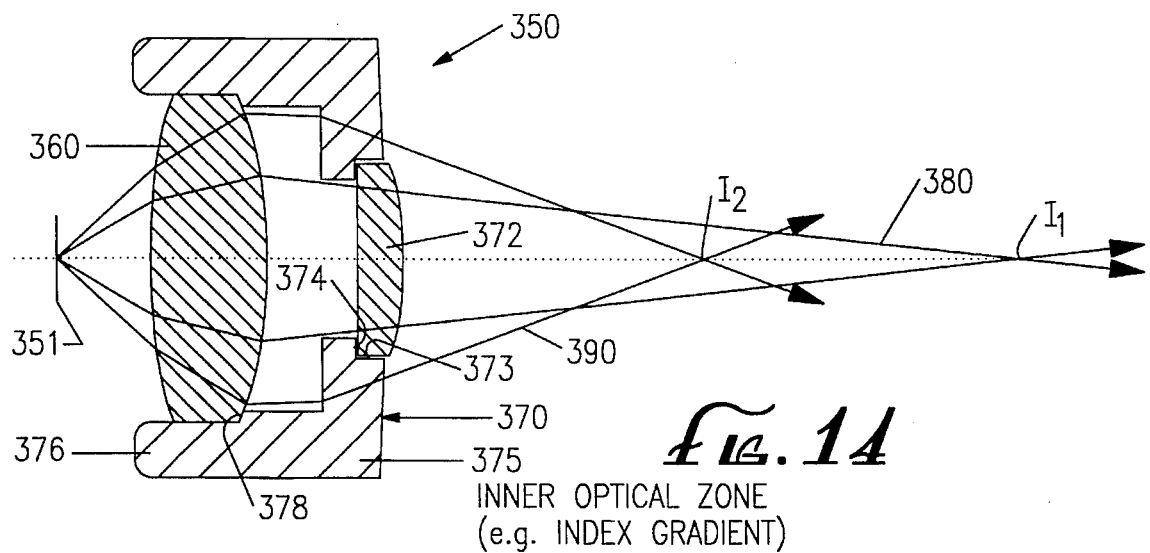
FIG. 14 is a diagrammatic side view of another alternate optical corrector plate and focusing lens combination.

FIG. 14 illustrates yet another alternative optical corrector plate and focusing lens combination 350 having a unitary structure comprising an outer portion 370 and a primary focusing lens portion 360. Light from the source plane 351 passes through the focusing lens 360 and is divided into two portions 380 and 390 by the plate 370. The corrector plate 370 has a cylindrical lens holder portion 376 with an inner annular shoulder 378 (against which the focusing lens portion 360 is secured), an annular focusing portion 375, and a central opening 373 with an inner annular shoulder 374 which accommodates a central focusing lens 372. This embodiment illustrates a similar configuration to the dual lens embodiments of FIGS. 6 and 6A described above. The size of the opening in the corrector plate 370 and the optical properties of the central focusing lens 372 will determine the location for the waist at $I_1$ for the light portion 380 passing therethrough. At the same time, the optical properties of the outer annular section 375 (which of course may have no optical power) in conjunction with focusing lens 360 will focus the light portion 390 passing therethrough to a waist at $I_2$.

FIG. 15 illustrates an alternative optical corrector plate 400 located adjacent a focusing lens (not shown). The corrector plate 400 is comprised of a main portion 410 and a wedge section 420. The wedge section 420 divides the outgoing beam into a first beam portion 435 and a second beam portion 440. The portion of the beam passing through the central section 425 is focused to a waist location at $J_1$ and the portion of the beam passing through the outer annular section 430 is focused to a waist location at $J_2$. The corrector plate 400 is preferably constructed in a single molded piece of optical plastic material. The design and coatings for such corrector lens element may be fashioned by one skilled in the art for a particular application such as with the help of commercially available lens design software. Typically the corrector plate has two surfaces, an input side and an output side. The shape and coating of each surface may be different as required by a specific application. There is no requirement for optical symmetry about any axis within each section or zone. For example, off axis and wedged optical components may be used as well as materials that have varying index of refraction. The corrector plate 400 may be separate from the primary focusing lens, installed in a mounted arrangement in a unitary structure, or even mounted to the primary focusing lens by suitable optical adhesive.

The zone may also comprise regions having different diffractive properties, such as holographic optical elements or index gradient properties. Diffractive optics are generally considered those that bend or redirect an incoming light ray by means of a diffraction grating. This grating may be etched or embossed into an optical material. They may also be fabricated by photo lithographic techniques. Such optical components are available from Rochester Phototonics, Rochester, N.Y., and other suitable manufacturers. Index gradient optics perform their function by a varying index of refraction over the zone. A variance may be a radial, an axial or a combination gradient that is introduced at the time of manufacture. Index gradient components are commercially available, such as the SFG index gradient lenses produced by Nippon Sheet Glass.

Zones may be fabricated individually or in groups by any number of conventional fabrication techniques including diamond turning, molding, embossing, grinding/polishing, photo-etching and photo-polymerization. The materials used for each zone may in general be different and include any number of optical plastics (such as, for example, acrylic), glass or metal for reflective zones. The separate zones may be combined either by molding them in a single plastic part or by molding or otherwise fabricating separate parts and joining them by an appropriate mechanism such as by gluing, press fitting, or assembling into a barrel or other mechanical support. In the case of molded plastic parts, it is often advantageous to include molded reference or locating features in the part to facilitate assembly and alignment into the final system.

The multi-zone optical element may require (due to manufacturing and/or cost constraints) the fabrication flexibility of a plastic material, but, as previously described, plastic has poor thermal stability. One method to minimize this difficulty is to use a glass lens for the majority of the optical focusing power and a plastic corrector plate to implement the secondary functions. This approach is particularly advantageous when the glass lens has only spherical surfaces (simple surfaces) since these lens are very inexpensive to manufacture. Secondary functions may include providing some aspheric correction to part of the beam in order to provide a finer focus or to generate a secondary beam to improve performance for a particular application.

FIG. 16 illustrates another alternative optical corrector plate 450 comprising a main portion 455 and a wedge section 460. The main portion 455 may comprise the primary focusing lens element allowing for a one-piece integral construction with the wedge section 460. The wedge section 460 is comprised of a central section 475 and an outer annular section 470. The wedge section 460 divides the outgoing beam to simultaneously focus at two different waist locations at $K_1$ and $K_2$. The outer annular section 470 (having, for example, a diffractive optical surface 472) operates as a diffractive optical element to refract a portion of the beam, dividing it into a first beam portion 480 focusing to a waist location at $K_1$ and a second beam portion 485 focusing to a waist location at $K_2$. Simultaneously, the beam portion 490 passing through the central section 475 is also focused (by operation of the focusing lens 455, diffraction by the size and shape of the central section 475, and the optical properties of the material of the central section 475) to a waist location at $K_1$ (which may alternately be separate from the waist location of beam portion 480 thereby providing a third waist location).

FIGS. 17 and 18 illustrate another preferred optical corrector plate 500 comprising a main portion 510, a wedge section 520, and a central opening 525. The wedge section 520 will provide for focusing the secondary portion of the outgoing beam passing therethrough to a given waist location. Simultaneously, the size of the opening 525 will determine (in conjunction with the focusing lens, typically placed upstream of the plate 500, and in accordance with aperture diffraction theory) the waist location for the primary beam portion passing therethrough.

FIG. 17 illustrates the optical corrector plate 500 having front 528 and rear 530 surface sections. The surface sections 520, 530 may be surface optic material, coatings, or the like which provide for the desired beam dividing functions.

The embodiments described above all describe multiple function designs which divide the outgoing beam into beam portions, focusing the portions at different waist locations. FIGS. 19–20 illustrate a corrector plate 600 positioned adjacent a focusing lens 605 in which part of the outgoing beam is divided off for other non-scanning purposes. The corrector plate 600 has central section (shown as a window or opening 625) and an outer annular section 630. The beam portion 620 passing through the central opening 625 is focused at a waist location $L_1$ in accordance with aperture diffraction theory. The outer annular section 640 has a front reflective surface 632 which reflects the beam portion 635 along an alternate path such focusing to a position $L_2$. The surface 632 may comprise a coating such as semi-silvered or dielectric coating.

There are a multitude of purposes for this beam section 635. In systems that include a moving component, such as a rotating mirror for the generation of scanning laser beams, it is often desired to monitor and measure the motion. One way to do this is to mark the object that is moving with optically detectable marks and then detect the presence or absence of these marks at some fixed point. Typically this marking is done with a separate emitter and detector which are focused to a common point in space where the marks will pass when the object moves. Marks are then detected as they move through this focal point by changes in reflected light. The positional resolution of such a system is typically limited by the size of the aforementioned focus. Since laser light can be efficiently focused to a very small point, it is a preferred emitter for this application. The beam portion 635, which may otherwise be an unused portion of the outgoing laser beam, is used to illuminate these marks with a tightly focused, intense beam, a low cost photodetector, possibly with a collection lens, may then be positioned to intercept a portion of the light reflected from the marks and the varying signal from this photodetector would represent the passage of marks past the illuminating beam 635, and therefore produce an electrical signal indicative of the object's motion.

Another application for use of the beam portion 635 would be providing a detector at position $L_2$ to detect an electrical signal representative of the laser output power. Typically, laser diodes require closed loop power control to keep them within acceptable operating parameters as the ambient temperature changes and the laser ages. Most laser diodes have a feedback detector incorporated into the physical package that is used for this purpose. Potentially a lower cost laser diode assembly could be manufactured by deleting this detector and associated wiring and alignment. In many commercial laser diodes, this feedback detector has a wide range of sensitivities (due to process variations and alignments errors) from diode to diode. These sensitivities make necessary an adjustment procedure in any practical system. The use of a secondary beam 635 directed to a larger, more repeatable detector will provide a higher quality feedback signal.

In another embodiment, the secondary beam 635 may be routed along a secondary optical path that could include a scanning mechanism. The scanning mechanism might, for example, generate secondary scan lines orthogonal to the primary scan mechanism potentially providing for superior omni-directional read rate.

FIG. 21 illustrates another corrector plate 650 (which may be located next to a focusing lens not shown) in which part of the outgoing beam is also divided off for other purposes. The corrector plate 650 has central section (shown as a window or opening 660) and an outer annular section 655. The beam portion 680 passing through the central opening 660 is focused at a waist location $M_1$ (in accordance with aperture diffraction theory if the central portion is merely a hole). The outer annular section 655 has a front refractive surface 672 which acts to deflect the beam portion 675 passing therethrough to focus at a desired waist location at $M_2$ (or some other location). The surface 672 may also have diffractive properties so as to focus the beam portion at a desired distance. The second beam portion 675 may be for example used as a marker beam or other functions as previously described.

FIG. 21 also illustrates that the outer annular section 655 may act as a beam splitter itself splitting the section of the beam impinging thereon into first and second beam portions 670, 675. The first beam portion 670 is allowed to pass through and be focused at $M_1$ (or some other distance) and the second beam portion is refracted and directed to another location $M_2$.

Alternately, instead of refracting the second beam portion 675, the outer annular zone may reflect that beam portion along an alternate beam path similar to the beam portion 635 illustrated in the embodiment of FIG. 19.

FIG. 22 illustrates a preferred application of the multiple path corrector plates 600 of FIGS. 19–20 (it may also be used with the corrector plate 650 of FIG. 21). In FIG. 22 a scanning system 700 is illustrated employing an optical polygon 730 as the scan mirror element. A light source shown as laser diode module 710 controlled by a diode driver printed circuit board 712 generates an optical beam 715 which is focused by a lens (located within the barrel of the diode 710) and directed to the corrector plate 600. The corrector plate 600 (having the same configuration as in FIG. 19) divides the beam 715 into a first beam portion 716 and a second beam portion 717. The first beam portion 716 passes through the central portion 625 to fold mirror 730. The second beam portion 717 is reflected (and also is optionally refocused) toward fold mirror 740. The first beam portion 716 is reflected off fold mirror 730 and passes through a hole 733 in motor printed circuit board 732 onto the polygon mirror 735. As the polygon mirror 735 rotates, the beam 716 is scanned (in a scan plane) over a scanning beam angle, the scanned beam being directed out through the scanner window and toward the target. The optical polygon 735 is rotated or pivoted about its axis by a motor controlled by printed circuit board 732. Light reflecting or refracting off the target is then detected by a detector illustrated in this embodiment by a toroidal collection lens module 750 which is mounted to detector printed circuit board 755. The second beam portion 717 reflects off fold mirror 740 and bypasses the scanning polygon mirror 735 and exits through the scanner window. Since the second beam portion 717 is not scanning, it provides a stationary and therefore highly visible pointing beam to aid the operator in correctly aligning the scanner on the target.

It is noted that the above described embodiments, such as the corrector plate embodiment of FIG. 11, are not drawn to scale. In actuality, the size of the corrector plate 210 in a handheld scanner application may be on the order of 3–4 mm in diameter. The size of the corrector plate 210 is quite small in comparison to the focus distance for the waist locations $F_1$ and $F_2$. In the handheld scanner application, the waist locations $F_1$ and $F_2$ may be located for example 1275 mm and 110 mm respectively from the scanner window.

In some applications, one or more focusing zones in the corrector plate may be dynamically variable. For example, the effective focal power (frequency transmission characteristics or the like) of a particular zone might be varied by the application of an electrical voltage V, as shown in FIG. 11. Most materials and especially plastics exhibit some piezoelectric effects which change the physical size as well as the index of refraction of the plastic element under the influence of an electric field. Another example would be a zone that is physically free to move with respect to other zones. Such variations would be useful for generating an auxiliary scanning beam that could have a scan axis distinct from the primary axis in the bar code reader. Yet another variation would change the transmission properties of a zone (or physical properties such as its size) through the use of the liquid crystal light valve or similar mechanism. Transmission could then be set in response to an appropriate control signal, such as receive signal strength an array of zones could be fabricated with differing focal lengths and a matching liquid crystal shutter used to select one of the zones at a time. This selection mechanism would provide a means for generating beams focused at different locations in space that could be individually addressed by an electronic mechanism.

The corrector plate element could also be adjustably mounted so as to be movable along the beam axis relative to the primary focusing lens system. Such adjustment may provide for varying the location of the waist. Adjustment of the corrector plate element may also redirect one of the beam portions along a new path so as to perform a different function. For example, referring to the embodiment of FIG. 22, the corrector plate element 600 may be movably mounted on actuator 720 which is turn is mounted to printed board 755. As the corrector plate 600 is axially moved by actuator 720 along the path of beam 716 toward the fold mirror 730, the second beam portion 717 is directed along a new path (such as onto a mirror shown schematically as mirror 740a mounted to the underside of printed circuit board) enabling the second beam portion 717 to serve an alternate function such as a different type of aiming beam, a secondary scanning beam, a timing beam, illuminator beam, or feedback signal beam, or some other suitable function.

Thus, a scanning system and method capable of increased depth of field have been shown and described. Though described with respect to a preferred embodiment of an optical scanning device such as a bar code scanner, the device may be employed by other focusing mechanisms such as those employed by data transfer devices (such as readers and encoders), or other optical character recognition systems. Though certain examples and advantages have been disclosed, further advantages and modifications may become obvious to one skilled in the art from the disclosures herein. The invention therefore is not to be limited except in the spirit of the claims that follow.

What is claimed is:

1. An optical system for data reading, comprising:

a light source generating an optical beam along an outgoing optical path toward an object to be read; and a focusing lens system positioned in the outgoing optical path for focusing the optical beam, the focusing lens system comprising at least one focusing lens element and an optical element positioned in the outgoing optical path downstream of the focusing lens element, the optical element coaxially dividing the outgoing optical beam into respective optical beam portions, namely a central beam portion and an outer beam portion, the central beam portion being focused at a given first waist location and the outer beam portion being focused at a given second waist location which is spaced from said first waist location for simultaneous transmission along the outgoing optical path.

2. An optical system according to claim 1 wherein the first and second waist locations are spaced such that the central beam portion and the outer beam portion combine to produce a continuous total read range.

3. An optical system according to claim 1 wherein the optical element comprises a lenslet attached to the focusing lens.

4. An optical system according to claim 1 wherein the optical element comprises a lens spaced from the focusing lens.

5. An optical system for data reading, comprising:

a light source generating an optical beam along an outgoing optical path toward an object to be read; and a focusing lens system positioned in the outgoing optical path for focusing the optical beam, the focusing lens system comprising at least one focusing lens element and an optical corrector plate positioned in the outgoing optical path, the optical corrector plate including a plurality of optical zones coaxially dividing the outgoing optical beam into respective optical beam portions, the plurality of optical zones comprising a central optical zone and an outer annular optical zone, the central optical zone modifying the optical beam portion passing therethrough to focus at a given waist location, the outer annular optical zone modifying the optical beam portion passing therethrough to focus at a given waist location for simultaneous transmission along the outgoing optical path, wherein the central optical zone of the optical corrector plate comprises an elliptical shape with a diameter in a resolving axis smaller than that in a non-resolving axis.

6. An optical system for data reading, comprising:

a light source generating an optical beam along an outgoing optical path toward an object to be read; and a focusing lens system positioned in the outgoing optical path for focusing the optical beam, the focusing lens system comprising at least one focusing lens element and an optical corrector plate positioned in the outgoing optical path, the optical corrector plate including a plurality of optical zones coaxially dividing the outgoing optical beam into respective optical beam portions, the plurality of optical zones comprising a central optical zone and an outer annular optical zone, the central optical zone modifying the optical beam portion passing therethrough to focus at a given waist location, the outer annular optical zone modifying the optical beam portion passing therethrough to focus at a given waist location for simultaneous transmission along the outgoing optical path, wherein the optical corrector plate includes a holder portion within which the focusing lens element is mounted in a unitary structure therewith.

7. An optical system according to claim 6 wherein the focusing lens element is constructed from glass and the optical corrector plate is constructed from plastic.

8. An optical system for data reading, comprising:

a light source generating an optical beam along an outgoing optical path toward an object to be read; and a focusing lens system positioned in the outgoing optical path for focusing the optical beam, the focusing lens system comprising at least one focusing lens element and an optical corrector plate positioned in the outgoing optical path, the optical corrector plate including a plurality of optical zones dividing the outgoing optical beam into respective first and second optical beam sections, the plurality of optical zones comprising a central optical zone and an outer annular optical zone, the central optical zone having a construction which modifies the first optical beam section passing therethrough to focus at a given waist location, the outer annular optical zone comprising a beam splitter which splits the second optical beam section into first and second beam portions thereby allowing the first beam portion to pass therethrough and refracting the second beam portion to direct it along an alternate beam path.

9. An optical system according to claim 8 wherein the focusing lens element is constructed from glass and the optical corrector plate is constructed from plastic.

10. A method of producing a pattern of laser light for data reading over a range of distances comprising the steps of passing the laser light through a focusing lens to produce a focused beam along an outgoing beam path;

placing a secondary optical element in the outgoing beam path for dividing the focused beam into concentric beam portions comprising a central beam portion and an outer beam portion;

focusing the central beam portion at a first waist location and focusing the outer beam portion at a second waist location for simultaneous transmission along the outgoing optical path;

spacing the first and second waist locations from each other such that the central beam portion and the outer beam portion combine to produce a reading over the range of distances.

11. A method according to claim 10 wherein the secondary optical element comprises a lenslet attached to the focusing lens.

12. A method according to claim 10 wherein the secondary optical element comprises a lens spaced from the focusing lens.

* * * * *

Disclaimer 5,565,668—Brad R. Reddersen; Thomas C. Arends, both of Eugene, Oregon. MULTIPLE FOCUS OPTICAL SYSTEM FOR DATA READING APPLICATIONS. Patent dated October 15, 1996. Disclaimer filed Dec. 9, 1996, by the assignee, Spectra-Physics Scanning Systems.

The term of this patent shall not extend beyond the expiration date of Pat. No. 5,438,187.
*(Official Gazette,* June 17, 1997)